United States Patent [19]

Afkhampour et al.

[11] Patent Number: 4,661,687
[45] Date of Patent: Apr. 28, 1987

[54] METHOD AND APPARATUS FOR CONVERTING A FLUID TRACING SYSTEM INTO AN ELECTRICAL TRACING SYSTEM

[75] Inventors: Khosrow Afkhampour; Neville S. Batliwalla, both of Foster City, Calif.

[73] Assignee: Raychem Corporation, Menlo Park, Calif.

[21] Appl. No.: 732,527

[22] Filed: May 9, 1985

Related U.S. Application Data

[63] Continuation-in-part of Ser. No. 629,645, Jul. 11, 1984, abandoned.

[51] Int. Cl.$^4$ .............................................. F24H 1/10
[52] U.S. Cl. .................................................... 219/301
[58] Field of Search ............... 219/282, 283, 296, 300, 219/301, 406, 535; 138/33

[56] References Cited

U.S. PATENT DOCUMENTS

| | | | |
|---|---|---|---|
| 2,783,351 | 2/1957 | Conkling et al. | 219/10.79 |
| 2,938,993 | 5/1960 | Rudd | 219/8.5 |
| 3,315,703 | 4/1967 | Matthews et al. | 219/301 X |
| 4,002,881 | 1/1977 | West | 219/301 |
| 4,117,312 | 9/1978 | Johnson et al. | 219/548 |
| 4,203,186 | 5/1980 | Horner | 219/301 X |
| 4,401,156 | 8/1983 | Wojtecki et al. | 219/301 X |
| 4,459,473 | 7/1984 | Kamath | 219/553 |

FOREIGN PATENT DOCUMENTS

| | | |
|---|---|---|
| 021597 | 7/1981 | European Pat. Off. |
| 2157530 | 11/1971 | Fed. Rep. of Germany . |
| 2257185 | 1/1975 | France . |
| WO84/02048 | 5/1984 | PCT Int'l Appl. . |
| 1179039 | 1/1970 | United Kingdom . |
| 2047510 | 3/1980 | United Kingdom ................ 219/301 |

OTHER PUBLICATIONS

Ando, "Heating Pipelines with Electrical Skin Current", 3-9-1970, pp. 154-158.

Primary Examiner—Michael L. Gellner
Assistant Examiner—Brian W. Brown
Attorney, Agent, or Firm—Timothy H. P. Richardson; Herbert G. Burkard

[57] ABSTRACT

A method-and apparatus for converting a fluid tracing system, e.g., a thermally insulated steam heat tracing system for a substrate, into an electrical heat tracing system for the substrate. A typical steam tracing system includes a substrate to be heated; an interconnecting system of steam tracing tubes adjacent to and in thermal contact with the substrate; and thermal insulation surrounding the substrate and steam tracing tubes. The conversion method includes the steps of removing the thermal insulation at spaced-apart locations and opening up the plurality of interconnected tubes so that elongate electrical heating elements can be inserted into the tubes, inserting elongate electrical heating elements into the tubes, and connecting the elongate electrical heating elements to a power supply in order to heat the substrate. Preferably, a gel-forming liquid is introduced into the elongate tubes and is converted into a gel within the tubes.

21 Claims, 4 Drawing Figures

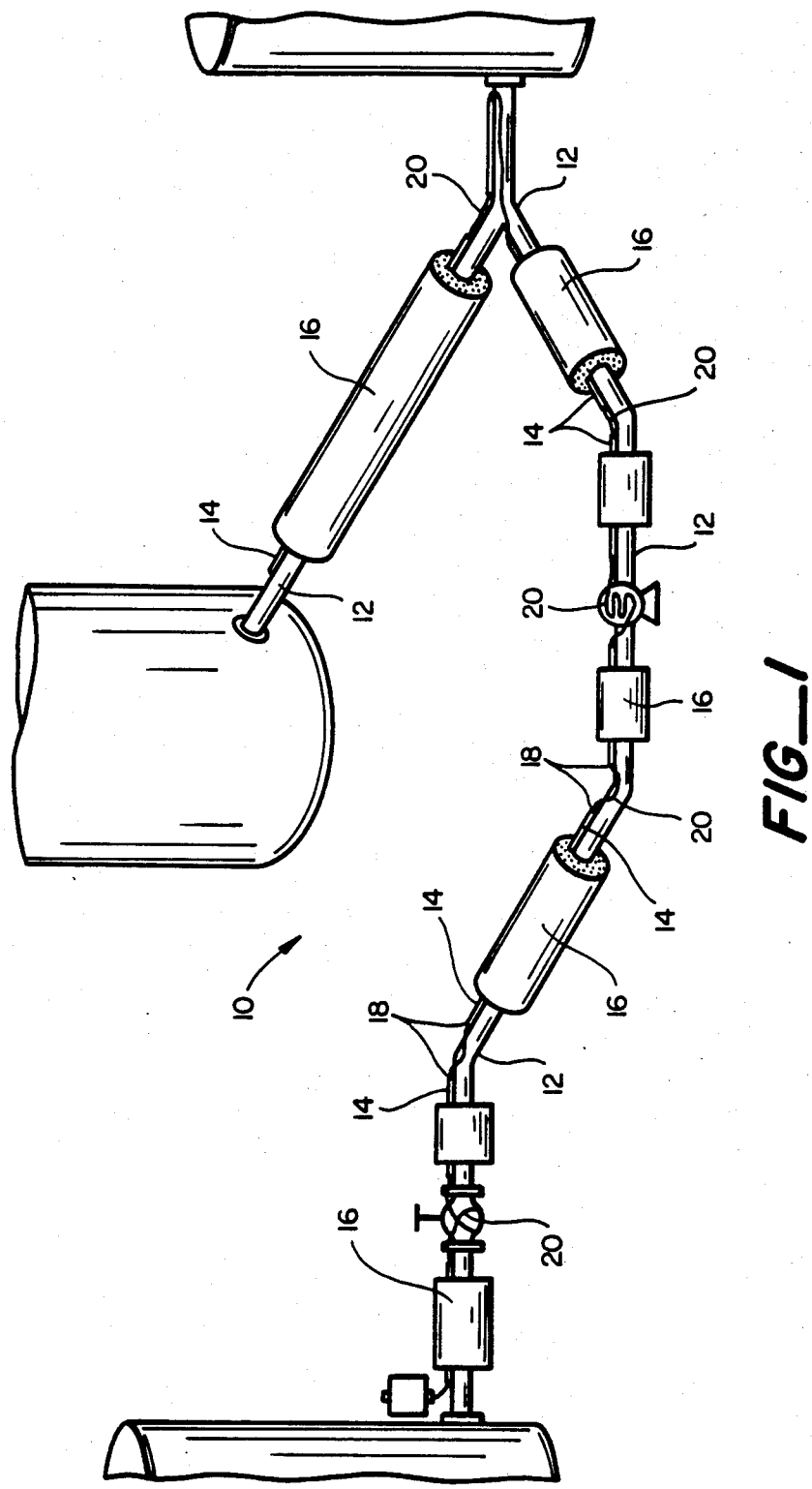

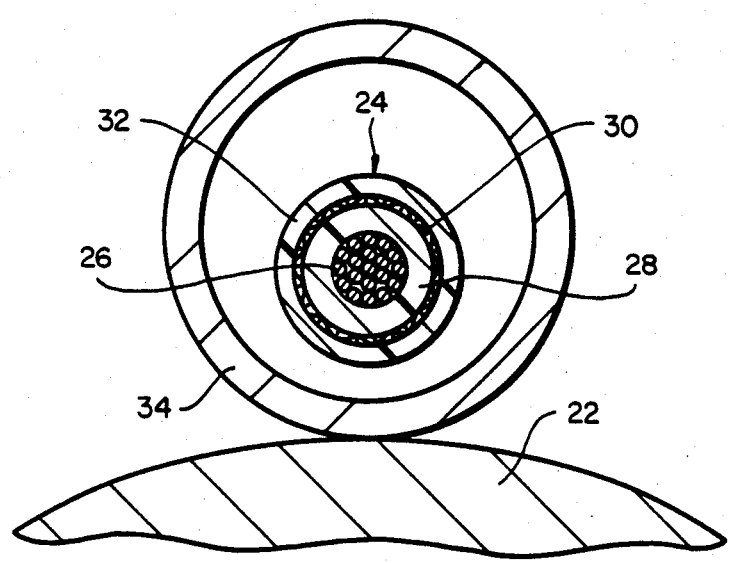
FIG_2
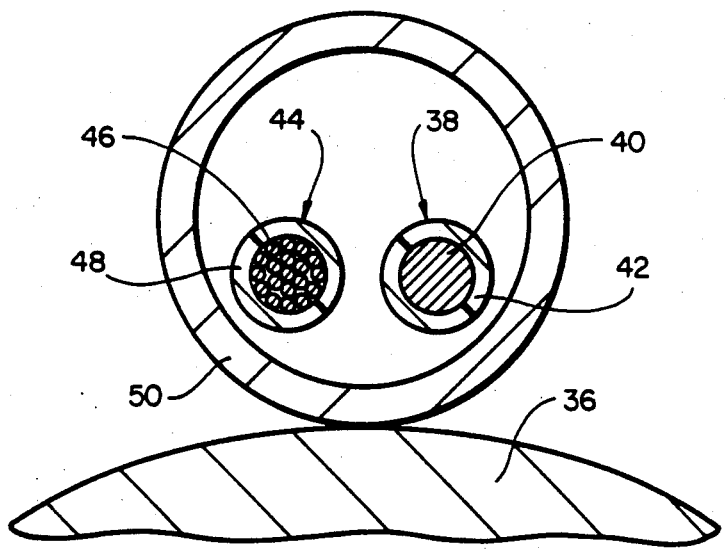
FIG_3

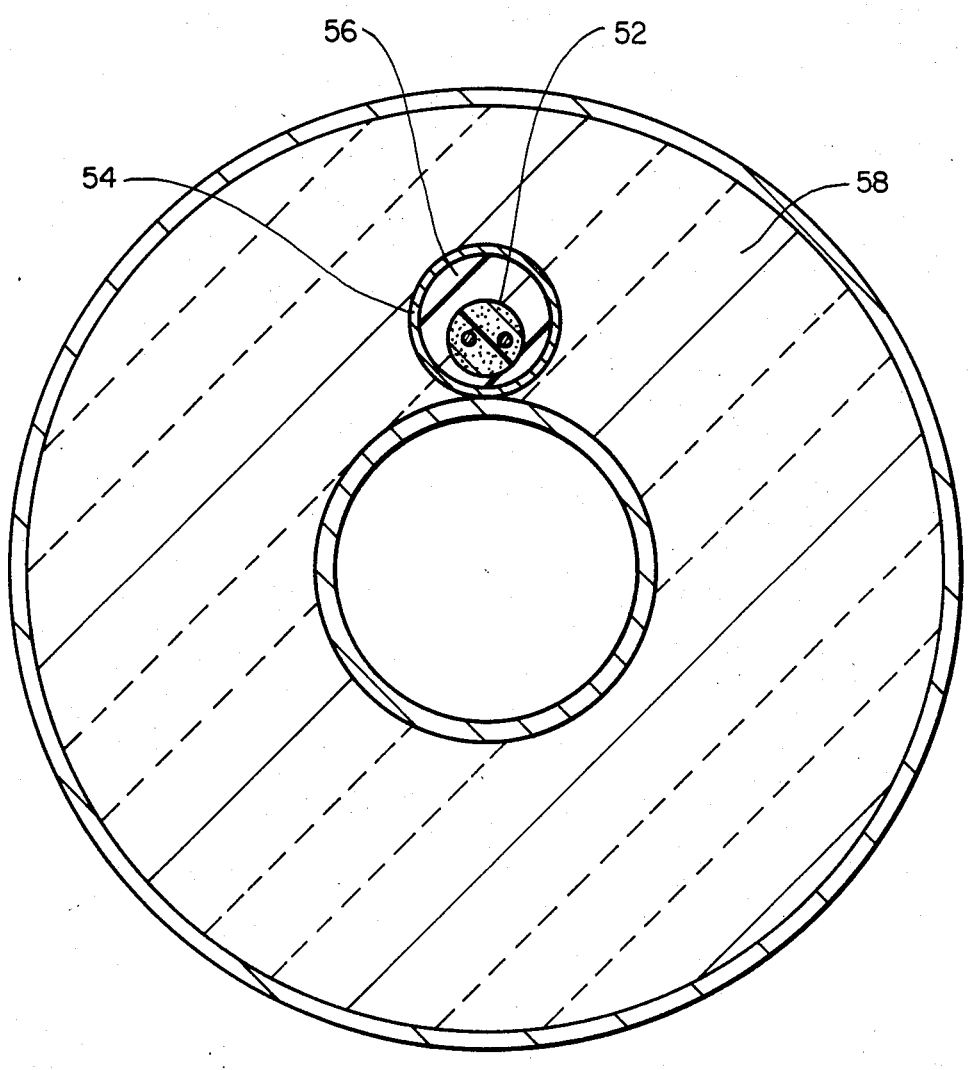
FIG_4

METHOD AND APPARATUS FOR CONVERTING A FLUID TRACING SYSTEM INTO AN ELECTRICAL TRACING SYSTEM

CROSS REFERENCE TO RELATED APPLICATION

This application is a continuation-in-part of copending commonly assigned application Ser. No. 629,645 filed July 11, 1984, now abandoned, and entitled "Method And Apparatus For Converting A Fluid Tracing System Into An Electrical Tracing System", the entire disclosure of which is incorporated herein by reference.

BACKGROUND OF THE INVENTION

Field of the Invention

This invention relates to a method and apparatus for converting a fluid tracing system into an electrical tracing system. The invention will be discussed primarily with reference to a typical fluid tracing system, namely, a steam tracing system. Any differences between the illustrative steam tracing system and other fluid tracing systems will be understood by those skilled in the art, having regard to their own knowledge and the disclosure herein.

Introduction to the Invention

Steam tracing systems are well known and typically include a substrate to be heated, an interconnecting system of steam tracing tubes adjacent the substrate, condensate return lines and thermal insulation surrounding the substrate and steam tracing tubes.

Summary of the Invention

In converting such a steam tracing system into an electrical tracing system, it is possible to remove the existing thermal insulation and then the steam tracing tubes, in turn followed by securing an electrical tracing system adjacent to the substrate and fitting this system with new insulation. It has been found, however, that this is a costly as well as a wasteful conversion method.

The present invention provides a novel method and apparatus for converting a fluid tracing system, e.g. a steam tracing system, into an electrical tracing system. The invention significantly reduces cost and avoids waste.

In one aspect, the invention provides a method of converting a thermally insulated steam heat-tracing system for a substrate into an electrical heat-tracing system for the substrate, said steam heat tracing system comprising a substrate, a plurality of inter-connected elongate tubes adjacent to and in thermal contact with the substrate so as to permit steam to be passed through the tubes in order to warm the substrate, and thermal insulation surrounding the elongate tubes and the substrate, which method comprises (1) at spaced-apart locations, removing the thermal insulation and opening up the plurality of interconnected tubes so that elongate electrical heating elements can be inserted into said tubes, (2) inserting elongate electrical heating elements into said tubes, and (3) connecting said elongate electrical heating elements to a power supply in order to heat the substrate.

In another aspect the invention provides an apparatus comprising (a) a substrate to be heated;

(b) a plurality of interconnected elongate tubes which are adjacent to and in thermal contact with said substrate, at least some of said tubes having once formed part of a former heating system for said substrate, in which system a heated fluid was passed through the tubes and thermal insulation surrounded the tubes and the substrate;

(c) an elongate electrical heating element which lies within and extends along said elongate tubes and which can be connected to a power supply to provide an elongate electrical heater; and (d) thermal insulation which surrounds the elongate tubes and the substrate, at least part of said thermal insulation being the same as the thermal insulation in said former heating system.

BRIEF DESCRIPTION OF THE DRAWINGS

The invention is illustrated in the accompanying drawing in which

FIG. 1 is a schematic diagram of the method and apparatus of the invention and

FIGS. 2, 3 and 4 are schematic drawings of the Examples which follow.

DETAILED DESCRIPTION OF THE INVENTION

As previously noted, the invention makes use of an elongate electrical heating element which can be connected to provide an elongate electrical heater. The heater is preferably self-regulating and may be, for example, a parallel heater.

Preferably, the heating element comprises at least two elongate conductors and a plurality of heating elements connected in parallel with each other between the conductors. Preferably, the heating element comprises a conductive polymer composition which exhibits PTC behavior. A preferred heating element comprises at least two elongate, spaced-apart conductors and an elongate resistive heating strip which is composed of a PTC conductive polymer and is wrapped around the conductors. For further details of such a heating element, reference may be made to U.S. Pat. No. 4,459,473, incorporated by reference herein. Many of the self-regulating heaters disclosed in U.S. Pat. No. 4,459,473 have a generally "flat" sided geometric configuration, to ensure adequate heat transfer from the heater to a substrate to be heated. For purposes of the present invention, however, we have found that it is advantageous to use a heater with a generally circular geometric configuration of radius 0.125 to 0.5 inch, for ease of installation in the elongate tubes and to maximize the power output of the heater. This makes it preferable to modify the products and procedures described in U.S. Pat. No. 4,459,473 in the following ways. First, the two elongate, spaced-apart conductors preferably are now entirely coated with a layer of conductive material e.g., a low resistivity substantially ZTC conductive polymer composition, before being contacted by the heating strip or wrapping. In the preferred procedure disclosed in U.S. Pat. No. 4,459,473, by contrast, only a portion of the conductor is coated, and this coating is done after the conductors are contacted by the heating strip. Second, the coating and wrapping steps are now carried out in a single stage, in contrast to a two stage process; this provides substantial cost savings and improvement in production rates. Third, to minimize twisting and rotation of the circular heater, annealing is now done at substantially higher temperatures (than for the flat geometry), e.g., at 400° F. to 600° F., as compared to the previous range of 400° F. to 490° F. The heater is connected to a suitable power source.

In another embodiment, the heater may comprise a solid insulated ferromagnetic wire e.g., a 14 AWG solid nickel wire; a ferromagnetic cladding over a paramagnetic wire (e.g., nickel clad copper wire); or a distributed one turn transformer with a shorted secondary.

The heater is connected to a suitable power source, which may be for example a conventional line voltage, e.g., of 110, 220, 440 or 600 volts AC, or a high frequency constant current supply. When a ferromagnetic heater is used, it is preferably adapted to operate when supplied with a current between 5 to 40 amps over a frequency range of 10K kz to 100K kz. Note, in this regard, that the steam tracing tubes, typically copper, provide a means to overcome any high frequency electromagnetic interference of the heater.

To complete an electrical circuit, there may be provided a return conductor e.g., a copper wire, which can be an integral part of the heater or a separate wire outside of the heater. Alternatively the return conductor can be provided by the steam tracing tubing or the condensate return line. The return conductor may also be an elongate heating element.

Since conventional steam tracing tubes typically have a 0.25 to 2 inch inner diameter, it is desirable in all cases to provide a heater with dimensions proportioned to fit inside the tubes with relative ease. It is also desirable to provide means for enhancing heat transfer from the heater to the tube, for example, by providing oil in the tube.

A particularly suitable heat transfer medium is a gel which lies between the heating element and the tube surrounding the element. Gel has an advantage over oil since it will not leak from the steam tracing tube. At the same time, it provides substantially the same high heat transfer characteristics as oil.

Preferably, the gel comprises a particulate thermally conductive, electrically insulated filler dispersed therein. Preferably, the gel is a polymeric material, for example, a polysiloxane, a polyurethane or a butyl rubber, which is introduced into the tube in the form of liquid precursors which gel in situ in the tube, e.g., with the aid of heat generated by powering the heating element.

A suitable gel may be prepared by using a two-component room temperature vulcanizing silicone rubber compound, for example, one available under the Trademark General Electric two part silicone material RTV6157A, and, a heat transfer oil, for example, one available under the Trademark General Electric SE-96-50, cured for 30 minutes at 150° F. For example, 5 grams of the silicone material can be mixed with 40 grams of the heat transfer oil and 5 grams of a catalyst, for example, a catalyst available under the Trademark General Electric CAT6157B.

Attention is now directed to FIG. 1 which provides a schematic diagram of the method and apparatus of the invention. A steam tracing system 10 is shown that includes a substrate 12 to be heated, an interconnecting system of steam tracing tubes 14 adjacent the substrate 12, and thermal insulation 16 surrounding the substrate 12. The steam tracing system 10 is converted into an electrical tracing system by opening up the steam tracing system at selected points, for example location 18, so that an elongate resistive heating element 20 can be inserted into the steam tracing tubes 14. The heating element 20 is installed throughout the steam tracing system by using, for example, a conventional "BLO-Rope" gun technique, to pull the heating element 20 through the steam tracing tubes 14.

EXAMPLE 1

A steam tracing system, converted into an electrical tracing system as illustrated in FIG. 2, included a substrate 22, a coaxial heating cable 24 with a 18 AWG stranded copper conductor 26 insulated with a polyolefin jacket 28, a tinned copper braid 30 used as a return conductor and an outer insulation 32 of polyolefin. The cable was inserted into a two foot section of a steam tracing system 34 comprising copper tubing. A power supply (not shown) was connected to the copper conductor and the braid and a constant current of 25 amps was passed through the cable. The following data was compiled.

| Pipe Temp. °F. | Power w/ft. |
| --- | --- |
| 48 | 4.5 |
| 100 | 4.8 |
| 149 | 4.9 |

EXAMPLE 2

A steam tracing system, converted into an electrical tracing system as illustrated in FIG. 3, included a substrate 36, a self-regulating heating cable 38 comprising 14 AWG solid nickel clad copper wire 40 with glass fiber insulation 42. A return conductor 44 comprised 14 AWB stranded copper wire 46 with glass fiber insulation 48. Both cables were inserted in a two foot section of a steam tracing system 50 comprising copper tubing, and one end of both cables was connected to a power supply (not shown) and the other end connected to each other. The power supply was a constant current, high frequency power supply and a current of 10 amps at 20 KHz was passed through the cable. The following data was compiled.

| Pipe Temp. °C. | Power w/ft. |
| --- | --- |
| 25 | 8.3 |
| 60 | 7.2 |
| 190 | 4.0 |

EXAMPLE 3

A steam tracing system converted into an electrical tracing system as illustrated in cross-section in FIG. 4, included a self-regulating heater 52 of the type disclosed in U.S. Pat. No. 4,459,473, but modified, in accordance with this disclosure, so that it had a circular geometric configuration for easy installation into a tube 54. The system included a gel 56 which lay between the heater 52 and the tube 54 surrounding the heater 52. A layer of thermal cladding 58 surrounded the tube 54.

We claim:
1. Apparatus comprising
 (a) a substrate to be heated;
 (b) a plurality of interconnected elongate tubes which are adjacent to and in thermal contact with said substrate, at least some of said tubes having once formed part of a former heating system for said substrate, in which system a heated fluid was passed through the tubes and thermal insulation surrounded the tubes and the substrate;

(c) an elongate electrical heating element which lies within and extends along said elongate tubes and which can be connected to a power supply to provide an elongate electrical heater; and (d) thermal insulation which surrounds the elongate tubes and the substrate, at least part of said thermal insulation being the same as the thermal insulation in said former heating system.

2. Apparatus according to claim 1 wherein the tubes have a 0.25 to 2 inch inner diameter.

3. Apparatus according to claim 1 wherein the heating element comprises at least two elongate conductors and a plurality of heating elements connected in parallel with each other between the conductors.

4. Apparatus according to claim 1 wherein said heating element, when connected to a suitable power supply, is a self-regulating heater.

5. Apparatus according to claim 4 wherein the heating element comprises a conductive polymer composition which exhibits PTC behavior.

6. Apparatus according to claim 5 wherein the heating element comprises at least two elongate, spaced-apart conductors and an elongate resistive heating strip which is composed of a PTC conductive polymer and is wrapped around the conductors.

7. Apparatus according to claim 1 which further comprises (e) a power supply which is connected to the heating element.

8. Apparatus according to claim 7 wherein the power supply supplies an alternating current whose frequency is 10,000 to 100,000 Herz and whose magnitude is fixed.

9. Apparatus according to claim 8 wherein said fixed magnitude is 5 to 40 amps.

10. Apparatus according to claim 1 wherein the heating element is a series heating element comprising a low resistance return conductor.

11. Apparatus according to claim 10 wherein the return conductor comprises said plurality of interconnected elongate tubes containing the heating element or a second plurality of interconnected elongate tubes which once formed part of said heating system.

12. Apparatus according to claim 1 which further comprises (e) a gel which lies between the heating element and the tube surrounding the element.

13. Apparatus according to claim 12 wherein said gel comprises a particulate thermally conductive filler dispersed therein.

14. Apparatus according to claim 12 wherein the gel is a polymeric material which has been cross-linked in situ in the tube.

15. Apparatus according to claim 12 wherein the gel is a polysiloxane, a polyurethane, or a butyl rubber.

16. A method of converting a thermally insulated steam heat-tracing system for a substrate into an electrical system for the substrate, said steam heat-tracing system comprising a substrate, a plurality of interconnected elongate tubes adjacent to and in thermal contract with the substrate so as to permit steam to be passed through the tubes in order to warm the substrate, and thermal insulation surrounding the elongate tubes and the substrate, which method comprises (1) at spaced-apart locations, removing the thermal insulation and opening up the plurality of interconnected tubes so that elongate electrical heating elements can be inserted into said tubes, (2) inserting elongate electrical heating elements into said tubes, and (3) connecting said elongate electrical heating elements to a power supply in order to heat the substrate.

17. A method according to claim 16 wherein each of said elongate heating elements is a self-regulating heating element which comprises at least two elongate conductors and a plurality of self-regulating heating elements connected in parallel with each other between the conductors.

18. A method according to claim 17 wherein each of said elongate heating elements comprises at least two elongate, spaced-apart conductors and an elongate resistive heating strip which is composed of a PTC conductive polymer and is wrapped around the conductors.

19. A method according to claim 18 wherein a gel-forming liquid is introduced into the elongate tubes and is converted into a gel within the tubes.

20. A method according to claim 19 wherein the liquid comprises a particulate thermally conductive filler.

21. A method according to claim 19 wherein the liquid comprises precursors for a polysiloxane, polyurethane or butyl rubber gel.

* * * * *

UNITED STATES PATENT AND TRADEMARK OFFICE

CERTIFICATE OF CORRECTION

PATENT NO. : 4,661,687

DATED : April 28, 1987

INVENTOR(S): AFKHAMPOUR et al.

It is certified that error appears in the above-identified patent and that said Letters Patent is hereby corrected as shown below.

In Claim 16, Column 6, lines 12-13, delete "electrical system" and substitute --electrical heat-tracing system--.

In Claim 16, Column 6, lines 15-16, delete "thermal contract" and substitute --thermal contact--.

Signed and Sealed this

Fifteenth Day of June, 1993

Attest:

MICHAEL K. KIRK

Attesting Officer

Acting Commissioner of Patents and Trademarks